US012535370B2

(12) United States Patent
Grau et al.

(10) Patent No.: US 12,535,370 B2
(45) Date of Patent: *Jan. 27, 2026

(54) METHOD FOR MECHANICAL SENSING UTILIZING CONTROLLED CURRENT

(71) Applicants: Alex Grau, Astoria, NY (US); Charles Hendee, Manteca, CA (US)

(72) Inventors: Alex Grau, Astoria, NY (US); Charles Hendee, Manteca, CA (US)

(73) Assignee: Tactonic Technologies, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/646,995

(22) Filed: Apr. 26, 2024

(65) Prior Publication Data
US 2024/0272022 A1 Aug. 15, 2024

Related U.S. Application Data

(60) Division of application No. 16/733,960, filed on Jan. 3, 2020, now Pat. No. 11,971,317, which is a continuation of application No. 13/943,593, filed on Jul. 16, 2013, now Pat. No. 10,527,505.

(60) Provisional application No. 61/676,720, filed on Jul. 27, 2012.

(51) Int. Cl.
G01L 1/20 (2006.01)
G01L 1/00 (2006.01)
G01L 1/22 (2006.01)

(52) U.S. Cl.
CPC .............. *G01L 1/20* (2013.01); *G01L 1/005* (2013.01); *G01L 1/205* (2013.01); *G01L 1/2293* (2013.01)

(58) Field of Classification Search
USPC .......................................... 702/41
See application file for complete search history.

(56) References Cited

U.S. PATENT DOCUMENTS

| 3,196,324 | A | | 7/1965 | Stuetzer | |
|---|---|---|---|---|---|
| 4,293,987 | A | * | 10/1981 | Gottbreht | H05B 6/6435 29/25.42 |
| 4,843,891 | A | | 7/1989 | Brunner | |
| 2002/0104369 | A1 | * | 8/2002 | Baker | G01L 1/20 73/31.06 |
| 2004/0056669 | A1 | | 3/2004 | Morimoto | |
| 2005/0104911 | A1 | * | 5/2005 | Horning | B41M 3/006 347/9 |
| 2005/0156906 | A1 | | 7/2005 | Chu | |

(Continued)

*Primary Examiner* — Paul D Lee
(74) *Attorney, Agent, or Firm* — Ansel M. Schwartz

(57) ABSTRACT

A method for sensing. The method includes the steps of transmitting mechanical forces to one or more printed mechanical sensing elements. There is the step of sending prompting signals associated with the mechanical forces to a computer in communication with one or more printed diodes and the one or more printed mechanical sensing elements. There is the step of reconstructing with the computer the mechanical forces that were applied to the one or more printed mechanical sensing elements. An apparatus for sensing. The apparatus includes a computer. The apparatus includes one or more printed electronic diodes and printed mechanical sensing elements connected to the computer, the one or more printed electronic diodes detect mechanical signals applied to the one or more mechanical-sensing elements and that provide corresponding values to the computer.

1 Claim, 18 Drawing Sheets

(56) References Cited

U.S. PATENT DOCUMENTS

| | | | |
|---|---|---|---|
| 2007/0057793 A1* | 3/2007 | Alden | G08B 17/103 |
| | | | 340/572.1 |
| 2008/0054875 A1 | 3/2008 | Saito | |
| 2009/0033341 A1* | 2/2009 | Son | G01L 1/146 |
| | | | 324/663 |
| 2009/0256817 A1 | 10/2009 | Perlin | |
| 2010/0085798 A1 | 4/2010 | Lu | |
| 2010/0117974 A1* | 5/2010 | Joguet | G06F 3/04146 |
| | | | 345/173 |
| 2011/0001706 A1 | 1/2011 | Sanford | |
| 2012/0089348 A1 | 4/2012 | Perlin | |
| 2012/0092182 A1 | 4/2012 | Daniel | |
| 2013/0153277 A1 | 6/2013 | Menard | |

\* cited by examiner

METHOD FOR MECHANICAL SENSING UTILIZING CONTROLLED CURRENT

CROSS-REFERENCE TO RELATED APPLICATIONS

This is a divisional of U.S. patent application Ser. No. 16/733,960 filed Jan. 3, 2020, now U.S. Pat. No. 11,971,317, which is a continuation of U.S. patent application Ser. No. 13/943,593 filed Jul. 16, 2013, now U.S. Pat. No. 10,527, 505 issued Jan. 7, 2020, which is a nonprovisional of U.S. provisional application Ser. No. 61/676,720 filed on Jul. 27, 2012, all of which are incorporated by reference herein.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

With recent advances in thin-film transistors and organic/inorganic semiconductor inks, printed electronic techniques have seen increased development and usage. It is now possible to create transistors, light emitting diodes and flexible circuits using these printed electronic techniques, such as screen-printing, ink-jet and gravure. Printed electronic techniques provide the potential for low cost, lightweight and flexible electronics.

This invention formulates a means to concurrently utilize two printed electronic components, a printed sensing element 203 and a printed diode 208, in order to provide current flow control to a mechanical force sensor or sensors, and is manufactured using printed electronic techniques that allow for thin, flexible, low-cost production.

Different embodiments of the printed sensing element 203 have been in use for several decades. A printed sensing element 203 with force sensitive resistive material 24, for instance, has been in use since the 1970s. An issue with using a PSE 203 in a larger circuit or using several PSE 203 connected in a network is that current can flow in both directions through a sensing element, often creating alternate circuits that create false positive 224 or drain 223 cross-talk 222. In these situations, the crosstalk causes variability to the values of the signal being read from similar mechanical forces being applied to the PSE 203. To address this, the PSE 203 either had to be isolated into single element circuits or computer algorithms were used to compensate for the errors. A non-printed diode could be placed on a printed circuit board 8 before each PSE 203 but this would require networks of PSE 203 to return to the circuit board between each PSE 203 and would be impractical with an active sensing array 20 of PSE 203.

In prior art, a two-dimensional grid of PSE 203 forms an active sensing array of elements (ASA) 20. Tekscan, for instance, has created an ASA 20 using FSR material 24 that provides a time-varying pressure image.

Printed diodes are a relatively recent development, with continued growth in its commercial use over the past five years (2007-2012). The primary uses in the industry have been for organic light-emitting diode (OLED) displays and for flexible electronics. Breakthroughs in organic and inorganic semiconductors have made it possible to print electronic circuits on flexible substrates using printed electronic techniques.

This invention solves the cross talk 222 of the PSE 203 by depositing a printed diode 208 in contact with each PSE 203 to form a printed diode-sensing element (PDSE) 211. By using printed electronic techniques for the sensing element and the diode, one or more PDSE can be made that control the flow of current and can be made on a thin, low-cost, flexible substrate.

BRIEF SUMMARY OF THE INVENTION

This invention describes the printed-diode sensing element (PDSE) 211, which combines the mechanical force detection of a printed sensing element (PSE) 203 with the electrical current control of a printed diode 208 using printed electronic manufacturing techniques. A printed diode 208 is formed from one or more layers of doped semiconductor 205 and/or conductive material 201 printed in contact. Embodiments could utilizes, printed diode types such as an MS Junction 209 and P-N Junction 210. A MS Junction 209 is formed when an n-type semiconductor 207 is printed in contact with a conductive material 201. A P-N Junction 210 is formed when an n-type semiconductor 207 is printed in contact with a p-type semiconductor 206. A printed sensing element (PSE) 203 is made from two layers of printed conductive material 201 and one or more layers of mechanical sensing material (MSM) 202, which is printed between the layers of conductive material 201. An MSM responds to mechanical forces, changing the electrical properties of the PSE 203. MSM embodiments can include force sensitive resistor (FSR) material 23, piezoelectric material 204, and dielectric material 219. PSE layers are printed on one or more non-conductive surface substrates 22 to form sensor surface sheets 21. When PSE layers are printed on more than one sensor surface sheet 21, the sensor surface sheets are brought into mutual contact to form a PSE. Otherwise, the PSE is formed on the single sensor surface sheet 21. In the PDSE 211, a printed diode 208 is deposited between one side of conductive material 201 and the MSM 202 layers. The PDSE 211 can be designed as a single element, a network of elements or an active sensing array (ASA) 20. An ASA 20 is a grid of conductive traces 23 with a PSE 203 or PDSE 211 at the conductive trace intersections. The printed diode 208 and MSM 202 of the PDSE 211 can be deposited using printed electronic methods, including screen-printing, flexography, and inkjet.

The PDSE provides several advantages over a PSE 203. With the PDSE 211, there is no cross talk 222 through false positive 224 or drain 223 when connected to an ASA 20 or a network of elements. In an ASA 20 with the PDSE 211, for instance, current can only flow from output conductive traces 220 to input conductive traces 221, preventing alternate circuits from forming. As a result, the PDSE 211 does not require additional hardware or software to compensate for information that would be lost or gained from cross talk 222 drain 223 or false positive 224.

The present invention pertains to a sensor. The sensor comprises one or more printed mechanical sensing elements that detect mechanical forces applied to an element. The sensor comprises one or more printed diodes which are in contact with the one or more mechanical sensing elements and which control flow of electrical current to and from the one or more printed mechanical sensing elements. The sensor comprises a computer in communication with the printed mechanical-sensing elements which causes prompting signals to be sent to the one or more printed mechanical sensing elements and which reconstructs data signals received from the one or more printed mechanical-sensing elements through the one or more printed diodes.

The present invention pertains to a method for sensing. The method comprises the steps of transmitting mechanical forces to one or more printed mechanical sensing elements. There is the step of sending prompting signals associated with the mechanical forces to a computer in communication with one or more printed diodes and the one or more printed mechanical sensing elements. There is the step of reconstructing with the computer the mechanical forces that were applied to the one or more printed mechanical sensing elements.

The present invention pertains to an apparatus for sensing. The apparatus comprises a computer. The apparatus comprises one or more printed electronic diodes and printed mechanical sensing elements connected to the computer, the one or more printed electronic diodes detect mechanical signals applied to the one or more mechanical-sensing elements and that provide corresponding values to the computer.

DETAILED DESCRIPTION OF THE INVENTION

Figure 1A:
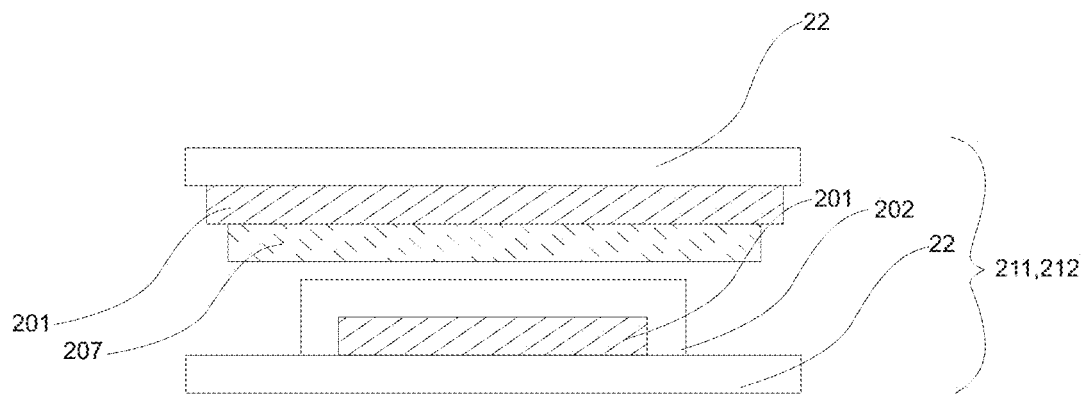
FIG. 1A shows a side view of the Single-MSM M-S Sensing Element (SMSSE) 212.
Figure 1B:
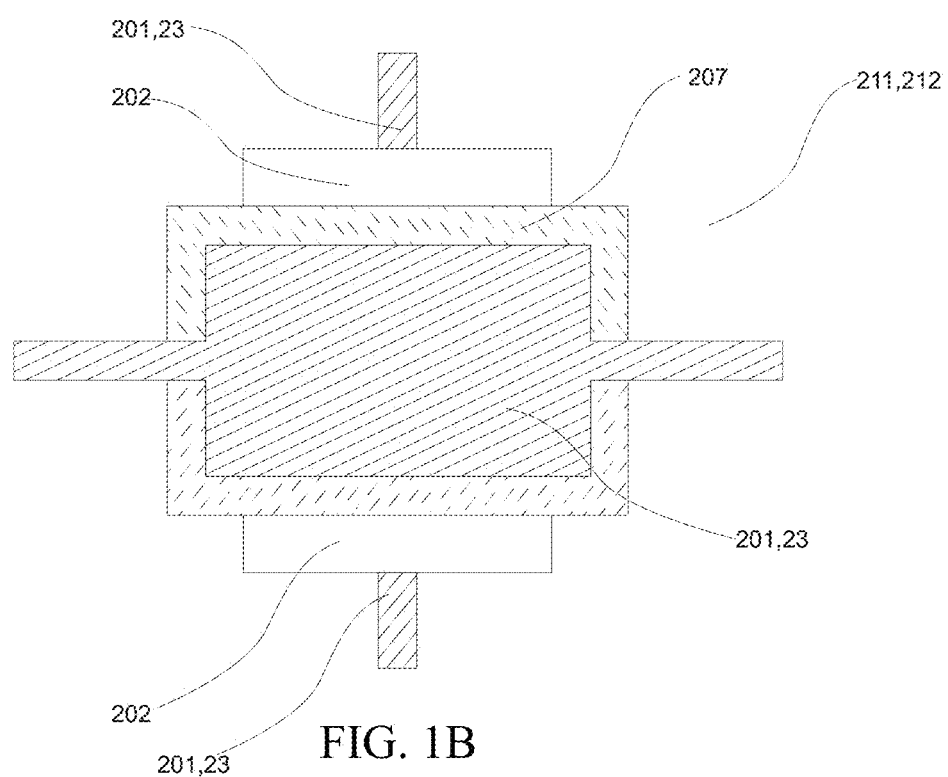
FIG. 1B shows a top view of the Single-MSM M-S Sensing Element (SMSSE) 212.

Referring now to the drawings wherein like reference numerals refer to similar or identical parts throughout the several views, and more specifically to FIG. 1A thereof, there is shown a sensor. The sensor comprises one or more printed mechanical sensing elements that detect mechanical forces applied to an element. The sensor comprises one or more printed diodes which are in contact with the one or more mechanical sensing elements and which control flow of electrical current to and from the one or more printed mechanical sensing elements. The sensor comprises a computer in communication with the printed mechanical-sensing elements which causes prompting signals to be sent to the one or more printed mechanical sensing elements and which reconstructs data signals received from the one or more printed mechanical-sensing elements through the one or more printed diodes.

The computer may be in communication with the one or more printed mechanical-sensing elements by conductive material which causes the prompting signals to be sent to the one or more printed mechanical sensing elements and which reconstructs the data signals received by the conductive material from the one or more printed mechanical-sensing elements through the one or more printed diodes. The conductive material may form a grid that defines intersections, whereby each intersection contains a printed mechanical sensing element in contact with a printed diode.

Each printed mechanical sensing element may include a force sensitive variable resistor. Each printed mechanical sensing element may include force sensitive resistive ink.

The grid and the printed mechanical sensing elements and the printed diodes may form a mechanical sensing layer.

The present invention pertains to a method for sensing. The method comprises the steps of transmitting mechanical forces to one or more printed mechanical sensing elements. There is the step of sending prompting signals associated with the mechanical forces to a computer in communication with one or more printed diodes and the one or more printed mechanical sensing elements. There is the step of reconstructing with the computer the mechanical forces that were applied to the one or more printed mechanical sensing elements.

The present invention pertains to an apparatus for sensing. The apparatus comprises a computer. The apparatus comprises one or more printed electronic diodes and printed mechanical sensing elements connected to the computer, the one or more printed electronic diodes detect mechanical signals applied to the one or more mechanical-sensing elements and that provide corresponding values to the computer.

List of All Components

A Printed Diode Sensing Element (PDSE) 211 consisting of:
  Printed Sensing Element (PSE) 203
    Nonconductive surface substrate 22
    Conductive material 201
    Mechanical Sensing Material (MSM) 202
  Printed Diode 208
    Technique: P-N Junction 210
      P-type semiconductor 206
      N-type semiconductor 207
    Technique: M-S Junction 209
      N-type semiconductor 207
Scanning Electronics consisting of:
  Microcontroller 5 which contains:
    Analog Digital Converter 83
    Digital I/O Pins 82
  Technique: Reading Voltage
    Operational Amplifiers 227
    Multiplexer 225
    Demultiplexer 226
  Technique: Reading Current
    Multiplexer 225
    Demultiplexer 226
    Current Shunt Monitor 228
    Operational Amplifiers 227

Glossary of Terms and Description of Components

Printed Material 200: a material that can be deposited using printed electronic techniques, like screen-printing, ink jet and gravure.

Conductive Material 201: a printed material 200 that conducts electricity.

Non-Conductive Surface Substrate 22: an insulator material that resists electric charge and provides a base for sensing element materials.

Sensor Surface Sheet 21: a non-conductive surface substrate 22 with conductive material 201, MSM 202 and/or doped semiconductors 205 printed on the non-conductive surface substrate.

Mechanical Sensing Material (MSM) 202: a printed material 200, which responds to mechanical forces.

Printed Sensing Element (PSE) 203: made from two layers of printed conductive material 201 and one or more layers of mechanical sensing material (MSM) 202, which is printed between the layers of conductive material 201. The PSE layers are printed on one or two non-conductive sensor surface sheets 22 so that the layers are brought into contact.

Force Sensitive Resistor (FSR) Material 24: a printed semi-conductive variable resistive material that reduces in resistance when force is applied.

Piezoelectric Material 204: a printed material that generates charge when mechanical force is applied to it. It is also possible to apply electrical signals to some piezoelectric materials to deform the material.

Doped Semiconductor 205: a semiconductor material that has impurities introduced to it in order to alter its electrical properties.

P-Type Semiconductor 206: a doped semiconductor that accepts weakly bound electrons.

N-Type Semiconductor 207: a doped semiconductor that has negative electron charge carriers.

Printed Diode 208: a printed electronic made from layers of doped semiconductor 205 and/or conductive material 201 that allow current to pass in one direction.

Metal-Semiconductor (M-S) Junction 209: one type of the printed diode 208 where an n-type semiconductor 207 is printed over conductive material 201 (or conductive trace) to create a metal-semiconductor junction, also called an Schottky barrier.

P-N Junction 210: one type of the printed diode 208 where an n-type doped semiconductor 207 is printed over a p-type doped semiconductor 205, which is printed over a conductive material 201 (or conductive trace 23) to create a P-N junction.

Printed Diode Sensing Element (PDSE) 211: combines the mechanical sensing qualities of a printed sensing element 203 with the current controlling properties of a printed diode 208.

Single-MSM M-S Sensing Element (SMSSE) 212: a single-sided MSM 202 M-S Junction 209 PDSE 211.

Single-MSM P-N Sensing Element (SPNSE) 213: a single-sided MSM 202 P-N Junction 210 PDSE 211.

Double-MSM M-S Sensing Element (DMSSE) 214: a double-sided MSM 202 M-S Junction 209 PDSE 211.

Double-MSM P-N Sensing Element (DPNSE) 215: a double-sided MSM 202 P-N Junction 210 PDSE 211.

One-Sheet Single-MSM P-N Sensing Element (OSPNSE) 216: a one-sheet single-sided MSM 202 P-N Junction 210 PDSE 211.

Dielectric Material 219: an insulator material that can become polarized and is used in resistive and capacitive sensors.

Conductive Traces 23: conductive material 201 that is used to connect one or more PSE 203, provide a pad of conductive material for printing MSM 203 and/or doped semiconductor 205, and/or connect to a circuit board 8.

Output Conductive Traces 220: a conductive trace 23 of an active sensing array 20 that is supplied with a voltage from the printed circuit board 8.

Input Conductive Traces 221: a conductive trace 23 of an active sensing array 20 that is the input to the printed circuit board 8 that is connected to the ADC 83.

Active Sensing Array 20: a grid of conductive traces 23 with a printed sensing element 203 or PDSE 211 at each conductive trace intersection.

Cross-Talk 222: a phenomenon found with PSE 203 without printed diodes 208 where unintended circuits are formed due to a lack of current control, which cause the input voltage and/or current to misrepresent the value of the printed sensing elements 203.

Drain 223: a form of cross talk where, after passing through a PSE 203, parallel circuits to the ADC 83 are created to ground, which result in a lower voltage and current on the ADC 83 being read. In an ASA 20 without printed diodes 208, alternate paths can be created if output or input traces are set to ground and multiple PSE 203 allow current to flow through them.

False Positive 224: a form of cross talk where unintended circuits are created between PSE 203 without printed diodes 208 to the ADC 83, resulting in increased voltage being read by the ADC 83. The increased voltage results in a value being read on a sensing element that is not sending signals.

Multiplexer 225: an integrated circuit that sends one of several electrical input signals that is connected to the integrated circuit.

Demultiplexer 226: an integrated circuit that sends a single signal down one of several outputs.

Operational Amplifier 227: an integrated circuit with a differential input and an output. Operational amplifiers can be used for a variety of purposes, including amplifying analog signals, setting a consistent analog voltage source value, stabilizing analog signals and measuring current.

Analog Digital Converter (ADC) 83: an integrated circuit that converts analog electrical signals to a numerical digital value.

Current Shunt Monitor 228: a type of operational amplifier 227 that is designed to measure current in a circuit by measuring voltage difference across a resistor.

Output Voltage 229: the voltage that is supplied from the printed circuit board 8.

Input Voltage 230: voltage that comes into the printed circuit board 8.

General Purpose of Each Layer: Printed Diode Sensing Elements

FIGS. 1A, 2A, 3A, 4A, and 16A show side views of various embodiments of the PDSE 211, the Single-MSM M-S Sensing Element (SMSSE) 212, Single-MSM P-N Sensing Element (SPNSE) 213, Double-MSM M-S Sensing Element (DMSSE) 214, Double-MSM P-N Sensing Element (DPNSE) 215 and One-Sheet Single-MSM P-N Sensing Element (OSPNSE) 216 respectively. In each PDSE 211 embodiment, a printed diode is deposited between one side of conductive material 201 and the MSM 202. The printed diode is formed from one or more layers of doped semiconductor 205 and/or conductive material 201. In each of the two sensor surface sheet 21 embodiments, seen in FIGS. 1A, 2A, 3A, 4A, the corresponding outer most layers of the PDSE 211 on each respective sheet 21 are aligned and in contact when the two surface sheets 21 are placed together.

The Single-MSM M-S Sensing Element (SMSSE) in FIG. 1A has MSM 202 over conductive material 201 on a non-conductive surface substrate 22 on one sensor surface sheet 21 and n-type semiconductor 207 over conductive material 201 on a non-conductive surface substrate 22 on the other sensor surface sheet 21. The SMSSE forms a M-S junction 209 printed diode and a single layer of MSM 202.

Figure 2A:
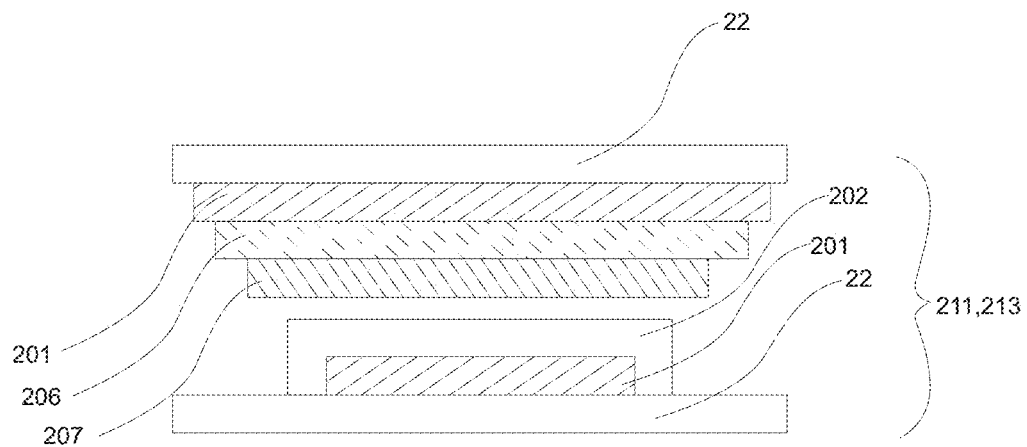
FIG. 2A shows a side view of the Single-MSM P-N Sensing Element (SPNSE) 213.
Figure 2B:
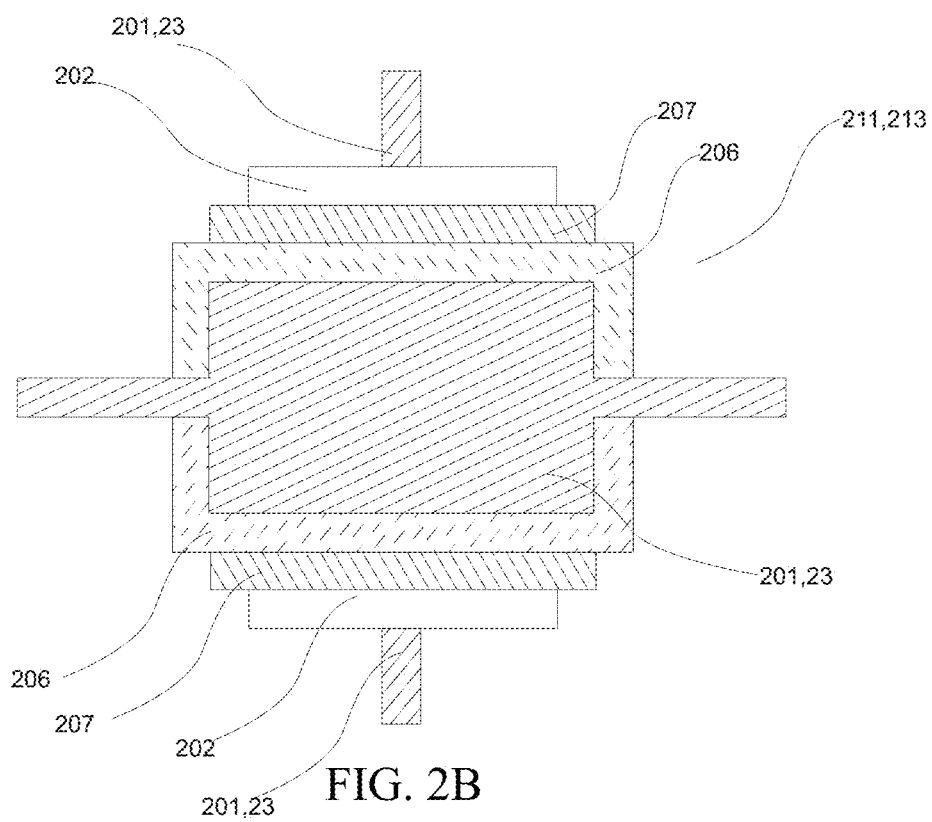
FIG. 2B shows a top view of the Single-MSM P-N Sensing Element (SPNSE) 213.

The Single-MSM P-N Sensing Element (SPNSE) in FIG. 2A has MSM 202 over conductive material 201 on a non-conductive surface substrate 22 on one sensor surface sheet 21 and n-type semiconductor 207 over p-type semiconductor 206 over conductive material 201 on a non-conductive surface substrate 22 on the other sensor surface sheet 21. The SPNSE forms a P-N junction 210 printed diode and has one layer of MSM 202.

Figure 3A:
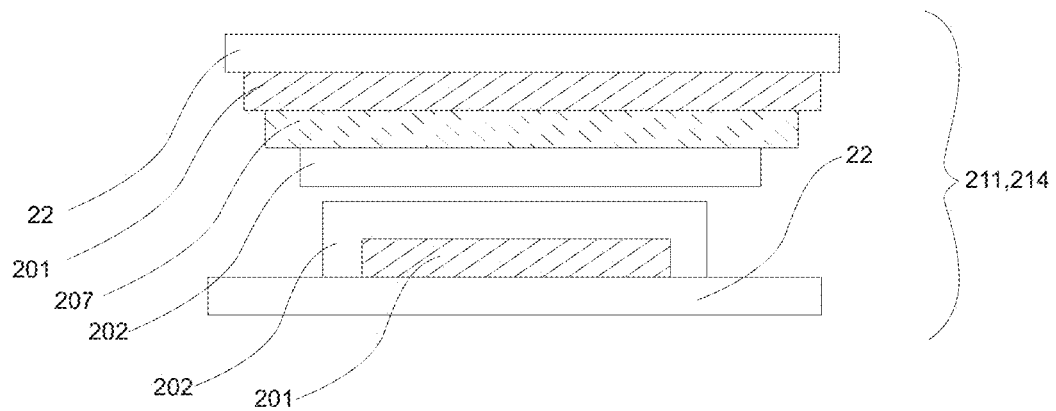
FIG. 3A shows a side view of the Double-MSM M-S Sensing Element (DMSSE) 214.
Figure 3B:
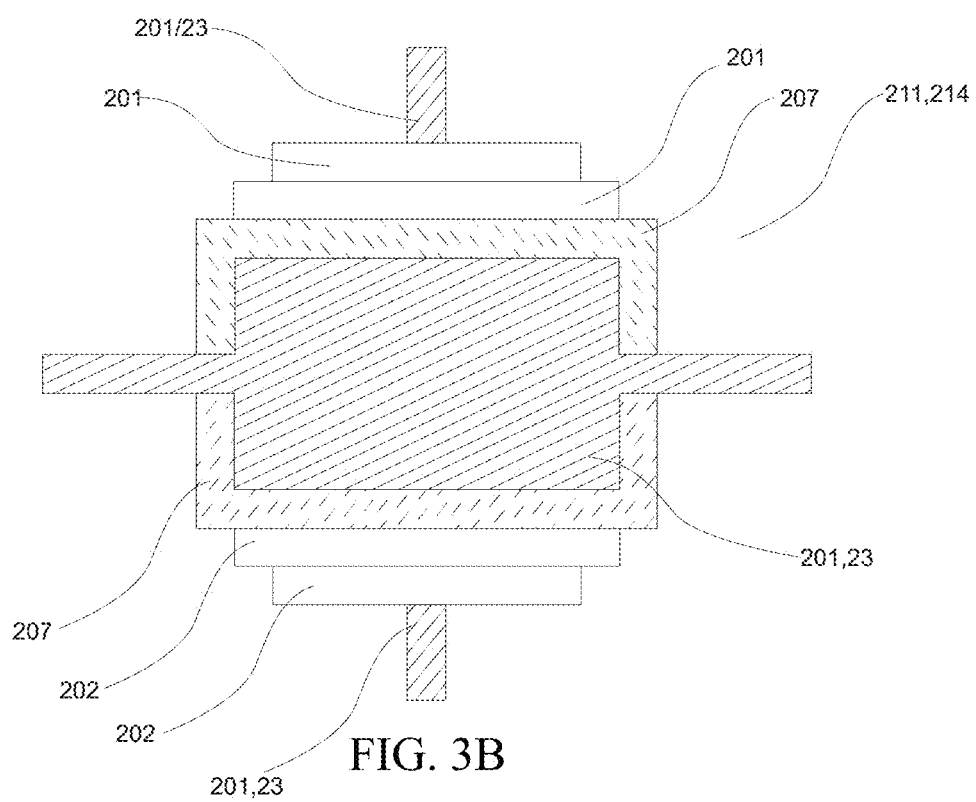
FIG. 3B shows a top view of the Double-MSM M-S Sensing Element (DMSSE) 214.

The Double-MSM M-S Sensing Element (DMSSE) in FIG. 3A has MSM 202 over conductive material 201 on a non-conductive surface substrate 22 on one sensor surface sheet 21 and MSM 202 over n-type semiconductor 207 over conductive material 201 on a non-conductive surface substrate 22 on the other sensor surface sheet 21. The DMSSE forms a M-S junction 207 printed diode and has two layers of MSM 202.

Figure 4A:
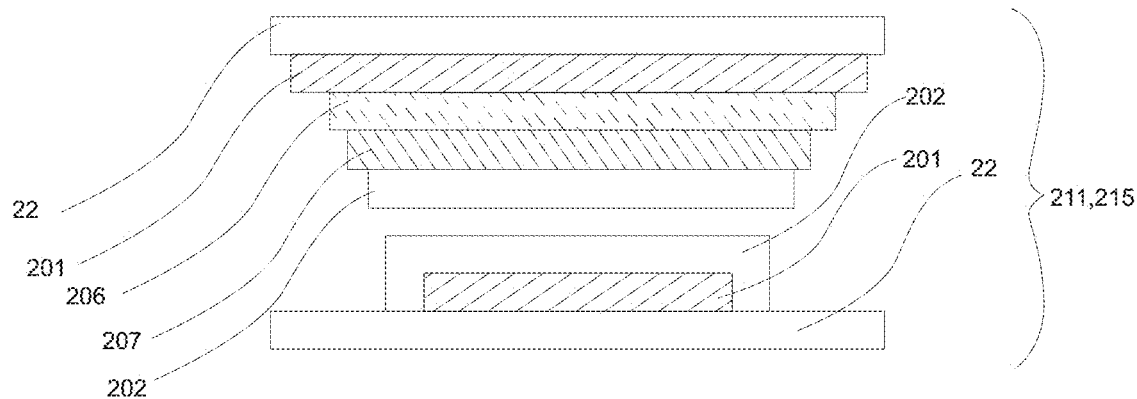
FIG. 4A shows a side view of the Double-MSM P-N Sensing Element (DPNSE) 215.
Figure 4B:
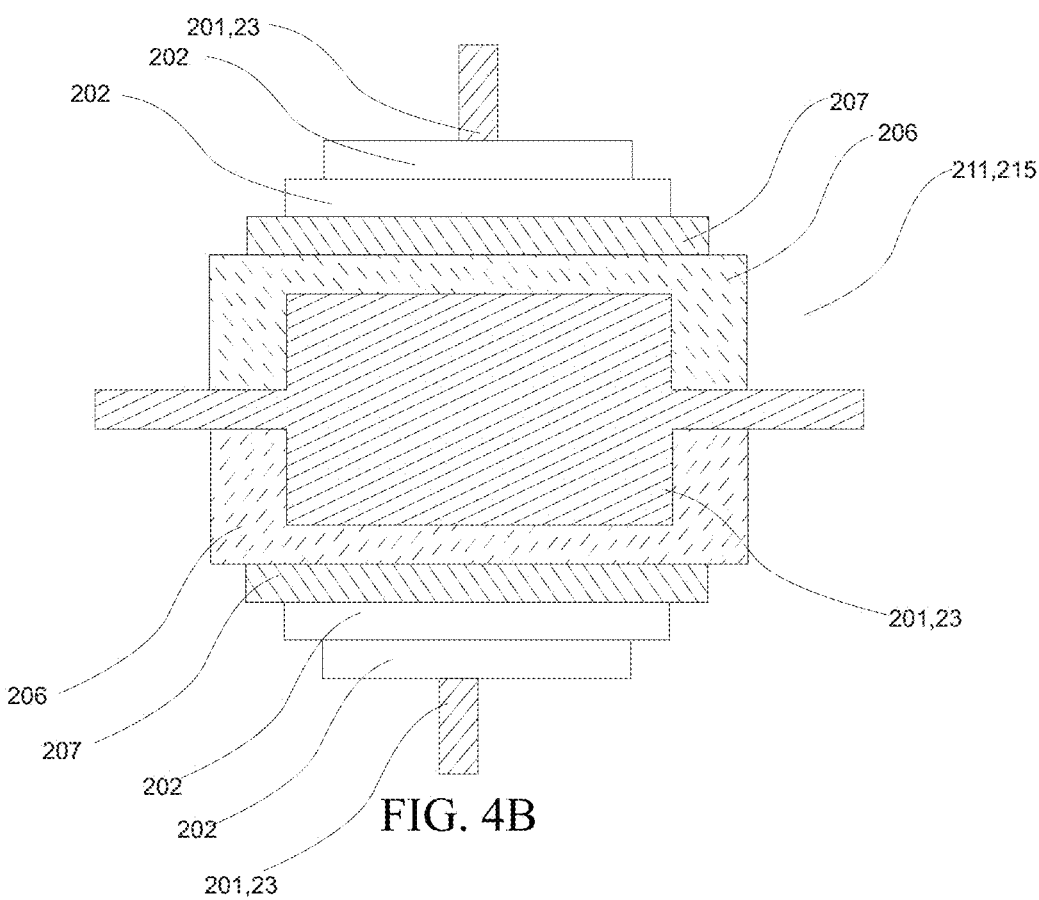
FIG. 4B shows a top view of the Double-MSM P-N Sensing Element (DPNSE) 215.

The Double-MSM P-N Sensing Element (DPNSE) in FIG. 4A has MSM 202 over conductive material 201 on a non-conductive surface substrate 22 on one sensor surface sheet 21 and MSM 202 over n-type semiconductor 207 over p-type semiconductor 206 over conductive material 201 on a non-conductive surface substrate 22 on the other sensor surface sheet 21. The DPNSE forms a P-N junction 210 printed diode and has two layers of MSM 202.

Figure 16A:
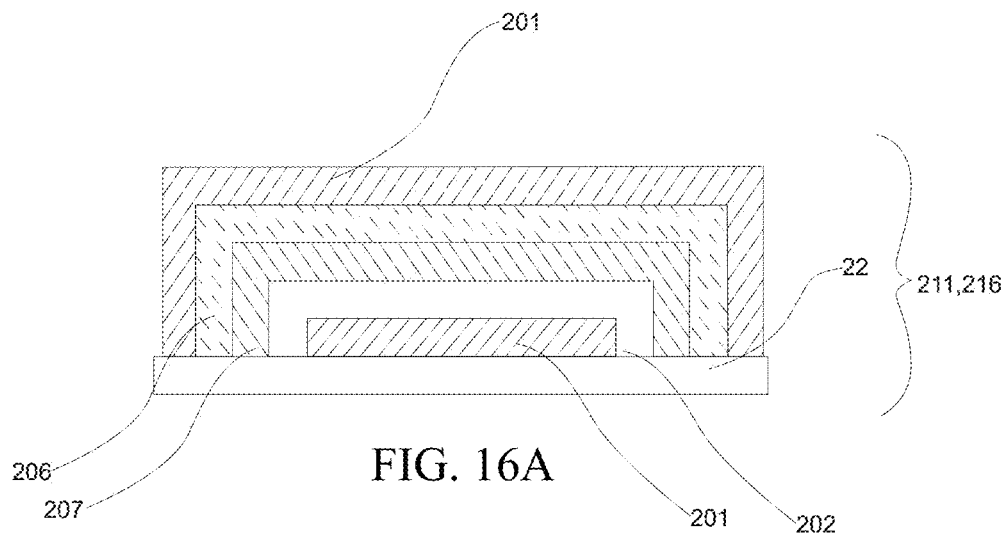
FIG. 16A shows a side view of the One-Sheet Single-MSM P-N Sensing Element (OSPNSE) 216.
Figure 16B:
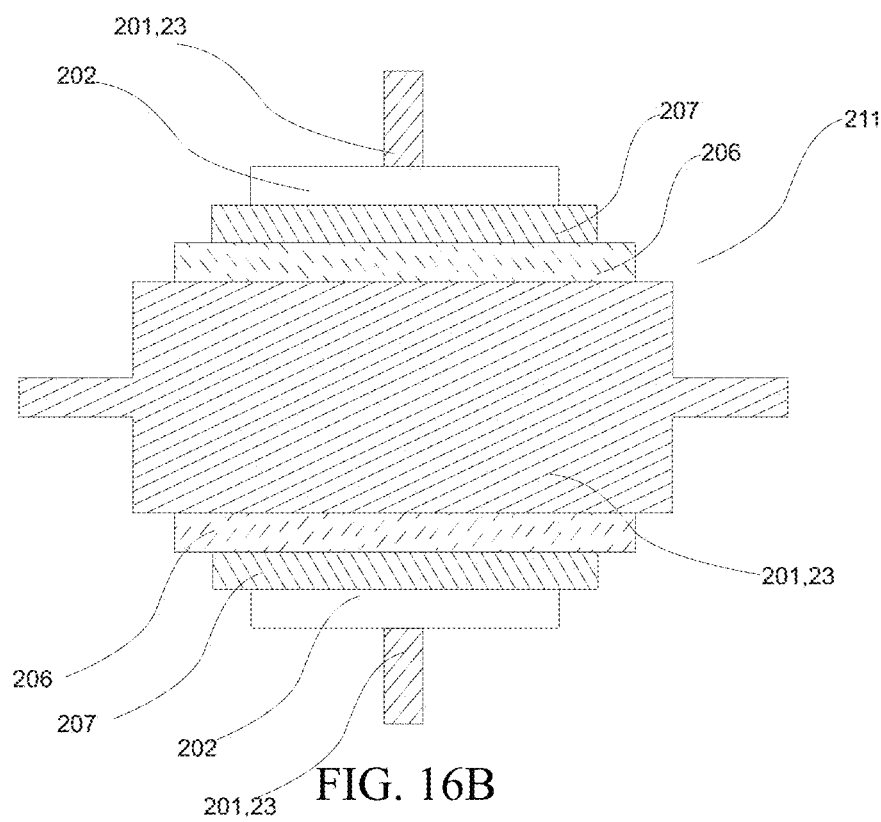
FIG. 16B shows a top view of the One-Sheet Single-MSM P-N Sensing Element (OSPNSE) 216.

The One-Sheet Single-MSM P-N Sensing Element (OSPNSE) in FIG. 16A has all the PSE 203 and printed diode layers on one sensor surface sheet 21. In this embodiment, conductive material 201, MSM 202, n-type semiconductor 207, p-type semiconductor 206, and conductive material 201 are printed in that order over a non-conductive surface substrate 22. The OSPNSE forms a P-N junction 210 printed diode and has one layer of MSM 202. In an alternate embodiment of the OSPNSE the materials could be printed in the opposite order.

Figure 17A:
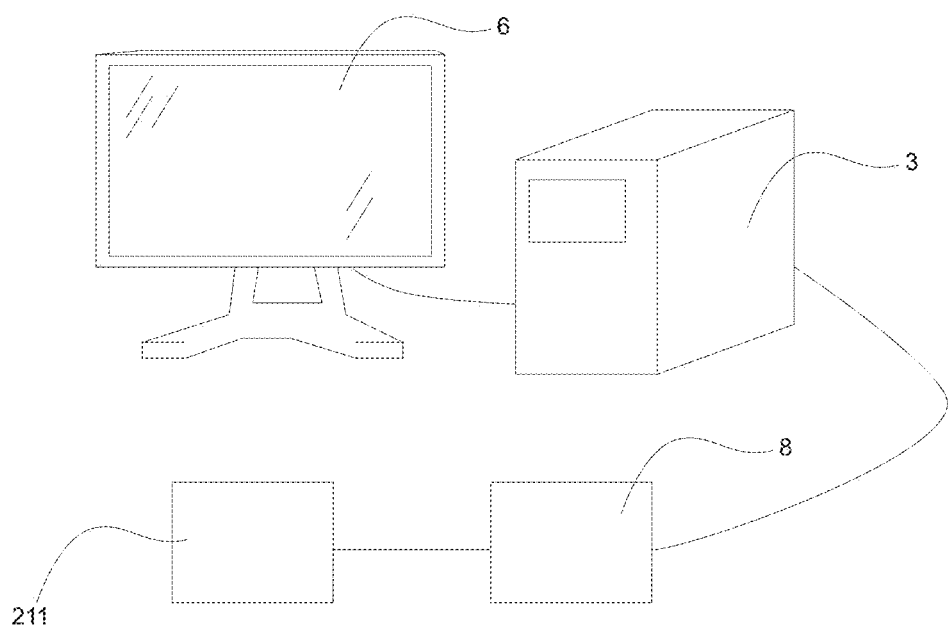
FIG. 17A shows a PDSE 211 and printed circuit board 8 connected to a computer 3 with a computer display 6.
Figure 17B:
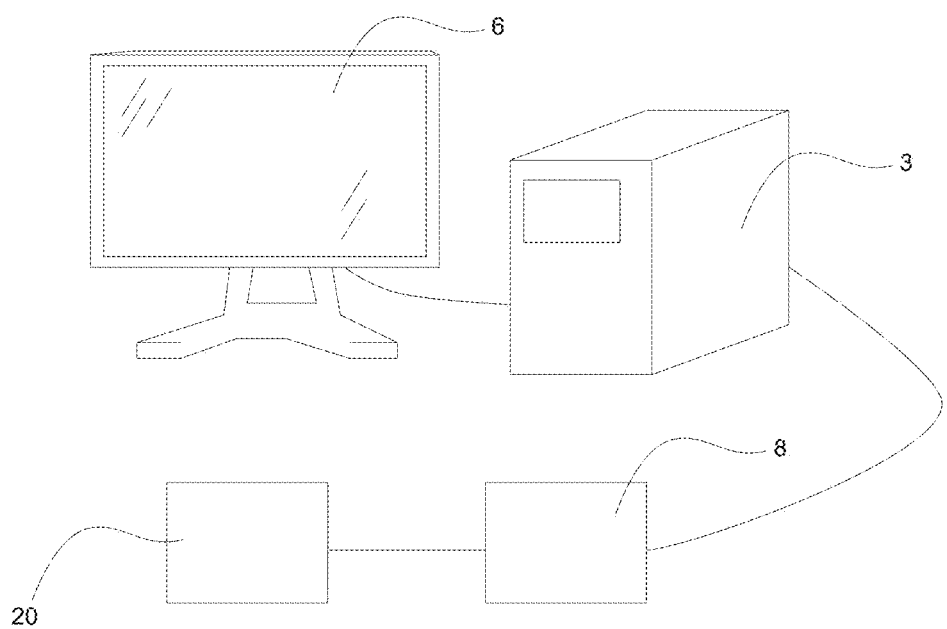
FIG. 17B shows an ASA 20 and printed circuit board 8 connected to a computer 3 with a computer display 6.

FIGS. 1B, 2B, 3B, 4B, and 16B show top view and alignment of the SMSSE 212, SPNSE 213, DMSSE 214, DPNSE 215 and OSPNSE 216 when the conductive material 201 is a conductive trace 23. Conductive traces 23 can be used when wiring one or more sensing elements into a circuit, a network or an active sensing array 20. As seen in FIGS. 1B, 2B, 3B, 4B, and 16B, the respective layers are printed with each subsequent layer becoming shorter along the direction of the conductive trace line and wider in the direction away from the trace to promote proper contact without shorting the connection for the respective the layers. Additionally, in some embodiments the conductive trace line 23 is enlarged to create a larger surface area at the location of the Printed Sensing Element 203, as seen in FIG. 17.

The Step-by-Step Description of the User Experience

In one-time step, mechanical forces are applied to a PDSE 211. The printed circuit board scans the PDSE 211 and sends the values corresponding to the detected mechanical forces to the computer 3.

On the computer 3, resulting values of the mechanical forces are stored in a region of computer memory. Software on the computer can store the values to secondary storage such as a hard disk, to display an image representation of the values on a computer display 6, perform analysis, or used for other purposes.

On the next time step, the above process is repeated, and so on for each successive time step.

The types of mechanical forces detected correspond to the type of mechanical sensing material 202 in the PDSE 211. For example, in an embodiment where FSR material 24 is the MSM 202, then the amount of force compressing the PSE 203 is detected.

Step by Step Description of Internal Workings

Printed Circuit Board to Output Conductive Traces

In this step, a voltage is supplied to an output conductive trace 220 by a printed circuit board 8.

Figure 18:
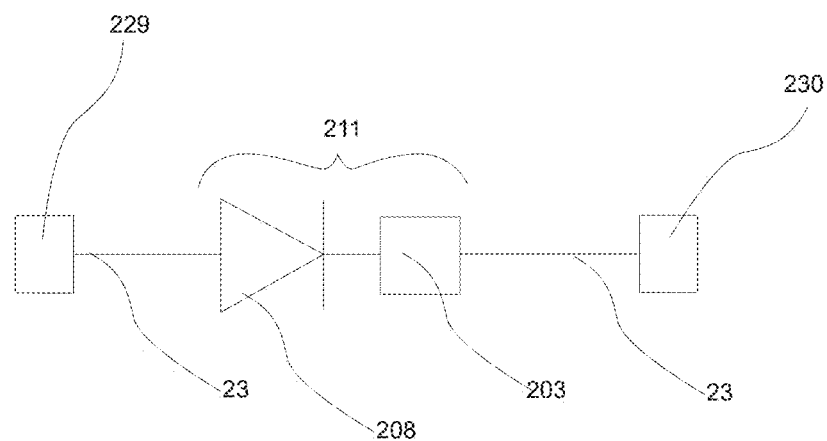
FIG. 18 shows a single PDSE 211 with a printed diode 208 and mechanical sensing material 203 connected to an output voltage 229 and an input voltage 230.

For a single PDSE 211 embodiment, an output voltage 229 is applied to the conductive trace 23 by a microcontroller 5, an operational amplifier 227 or another integrated circuit that can create the voltage. FIG. 18 shows a single PDSE 211 connected to an output voltage.

Figure 5:
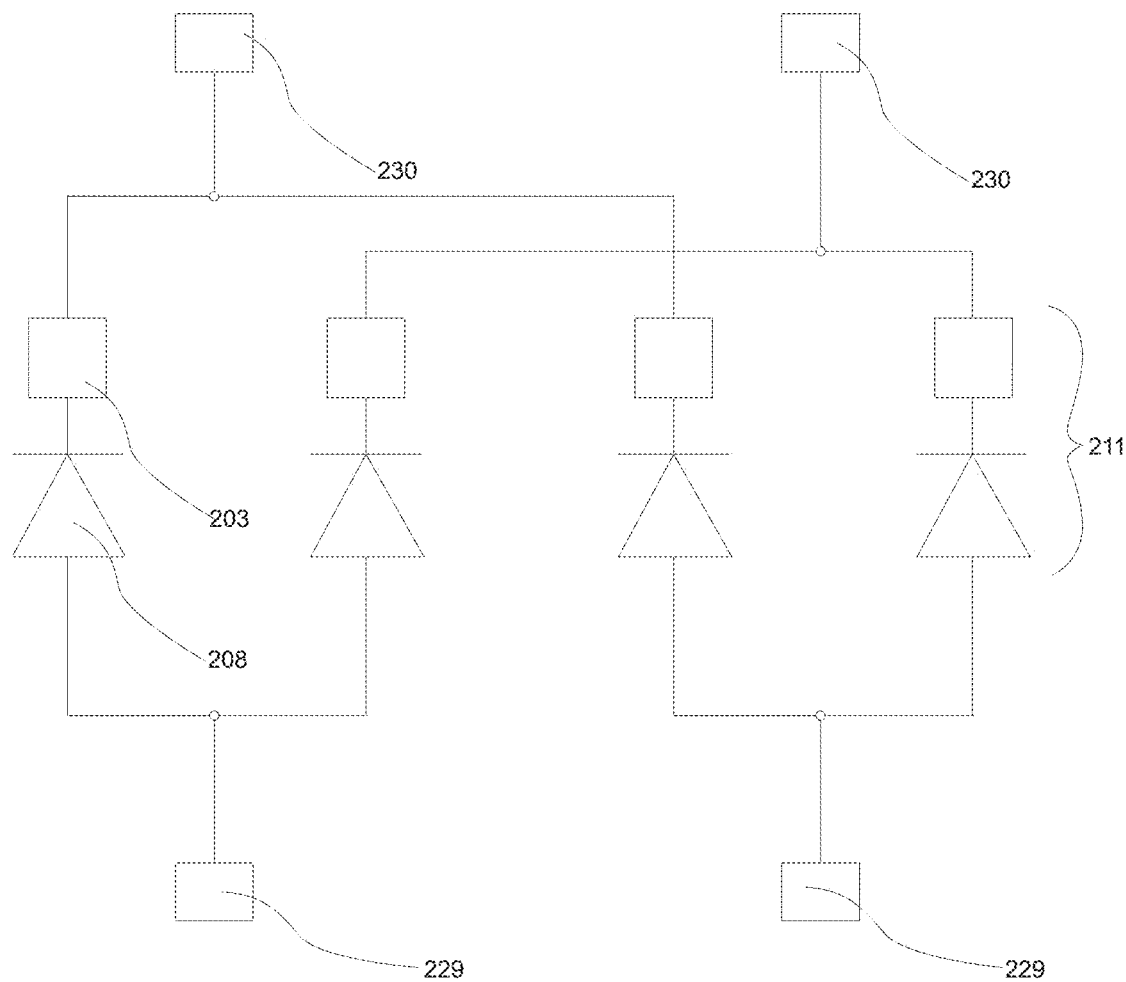
FIG. 5 shows the PDSE 211 network schematic used to control the flow of electric signals from an output voltage 229 to an input voltage 230.
Figure 6A:
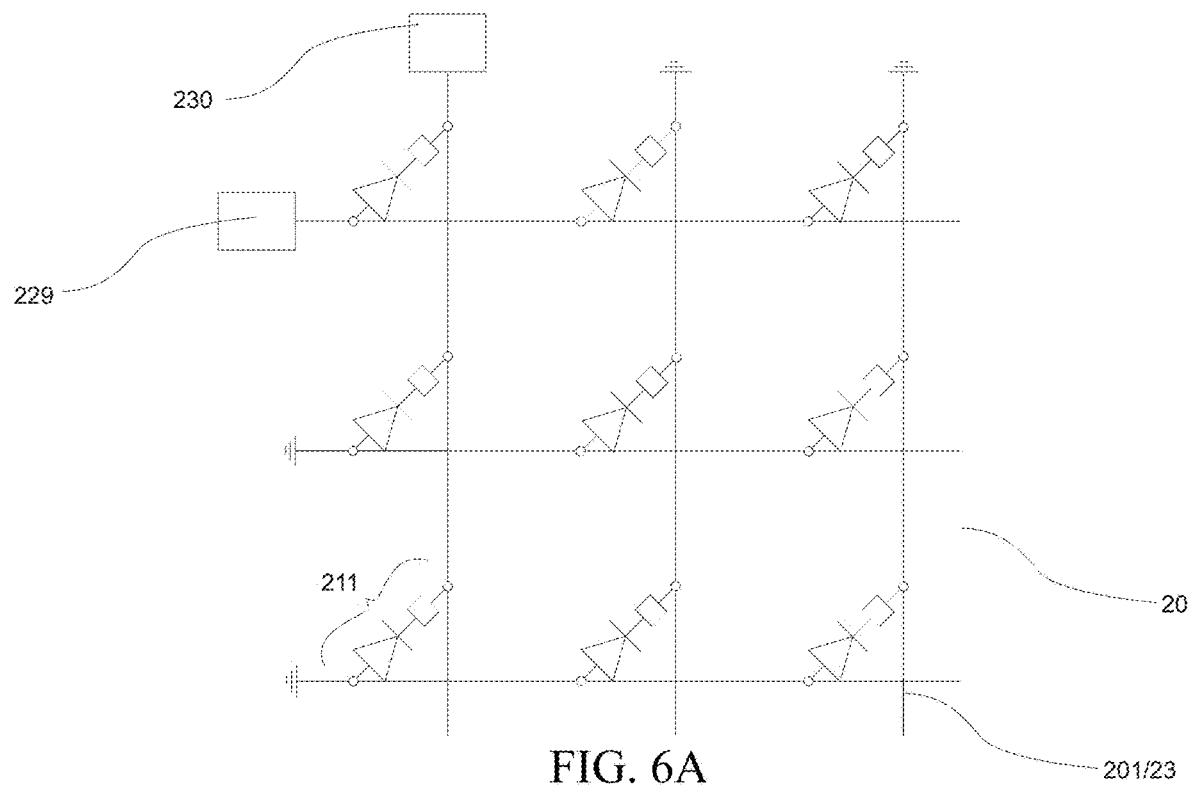
FIG. 6A shows a schematic of an ASA 20 with PDSE 211, where the top-left PDSE 211 is being scanned and non-active conductive traces 23 are set to ground.
Figure 6B:
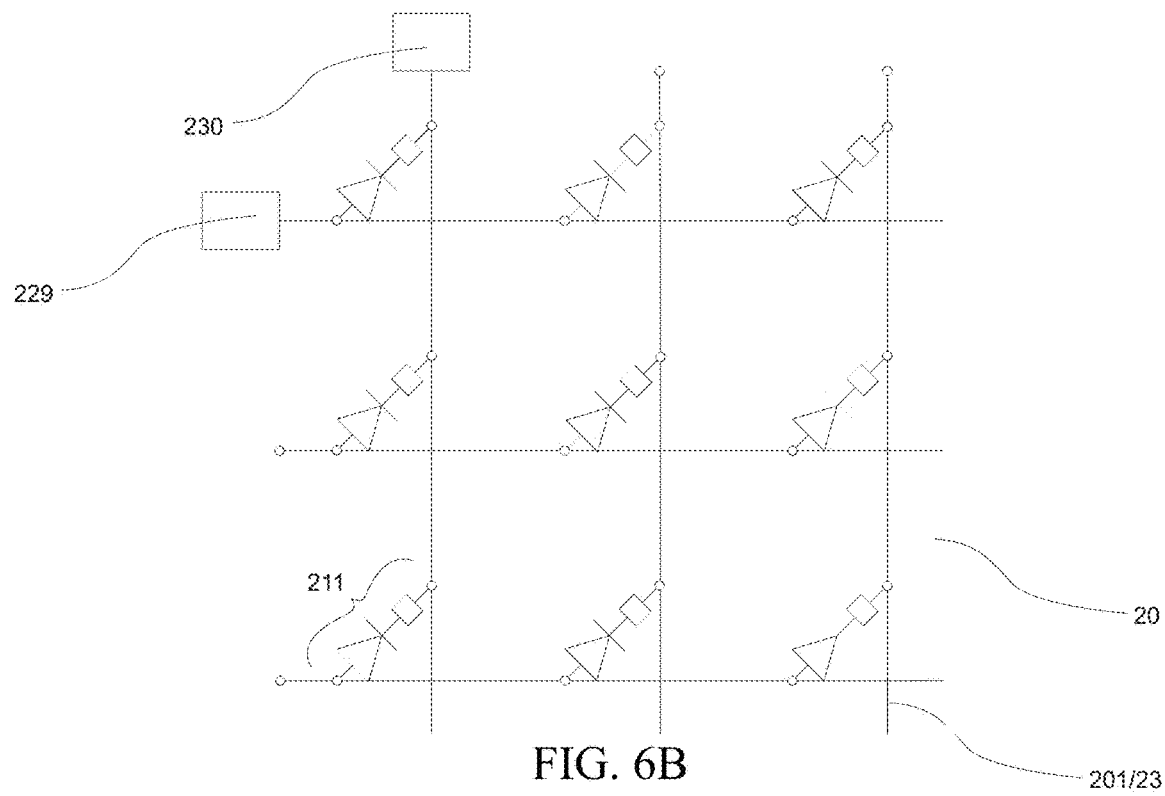
FIG. 6B shows a schematic an active sensing array 20 with PDSE 211, where the top-left PDSE 211 is being scanned and non-active conductive traces 23 are connected to high impedance or are floating.
Figure 7:
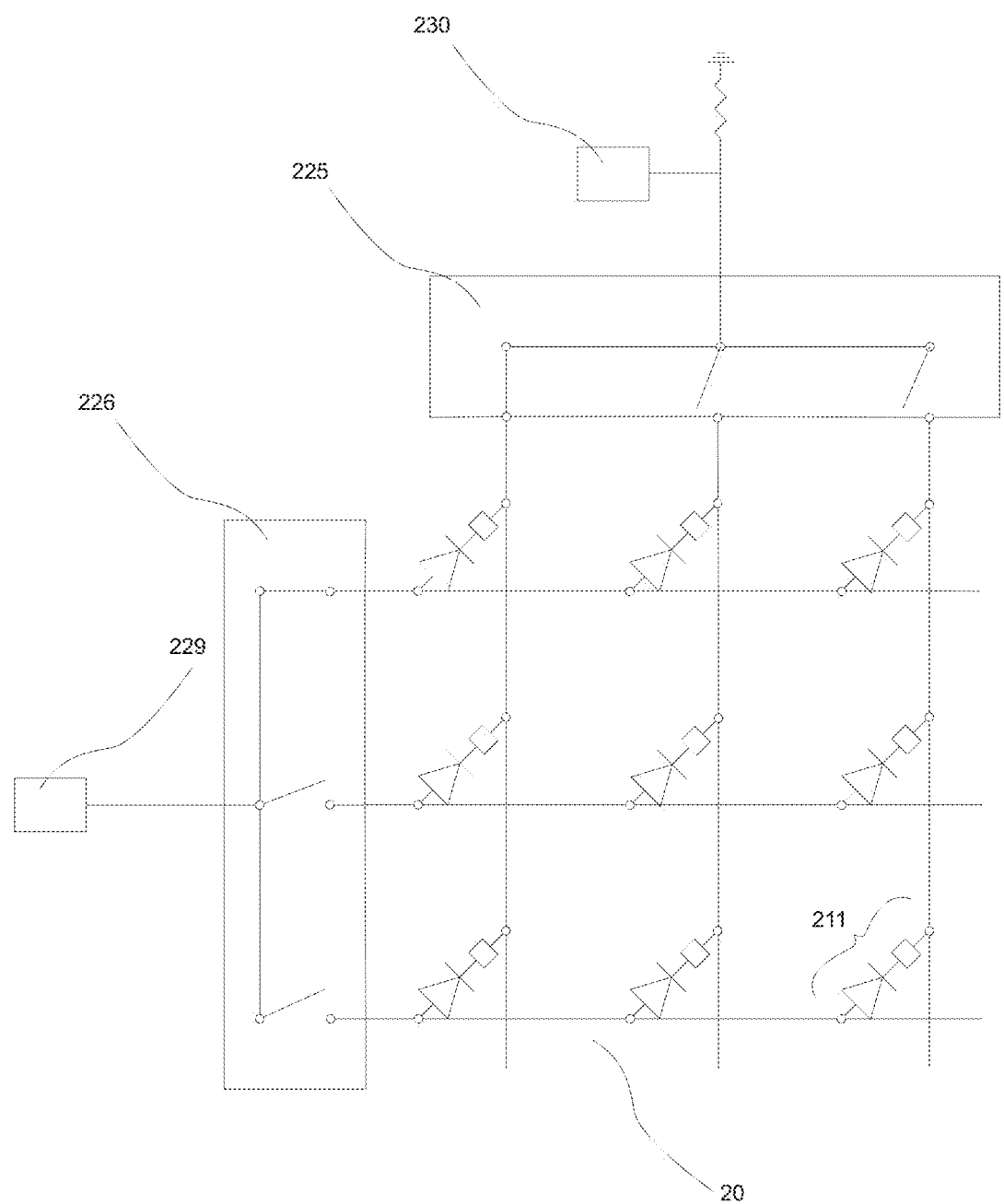
FIG. 7 shows a schematic of an active sensing array 20 where the top-left PDSE 211 is being scanned and non-active conductive traces 23 are connected to high impedance or are floating by using multiplexers 225 and demultiplexer 226.

A network of PDSE 211 can be connected to one or more output voltage 229. FIG. 5 shows an embodiment of a PDSE 211 network with two output voltages 229, each connected to two PDSEs 211.

Figure 9:
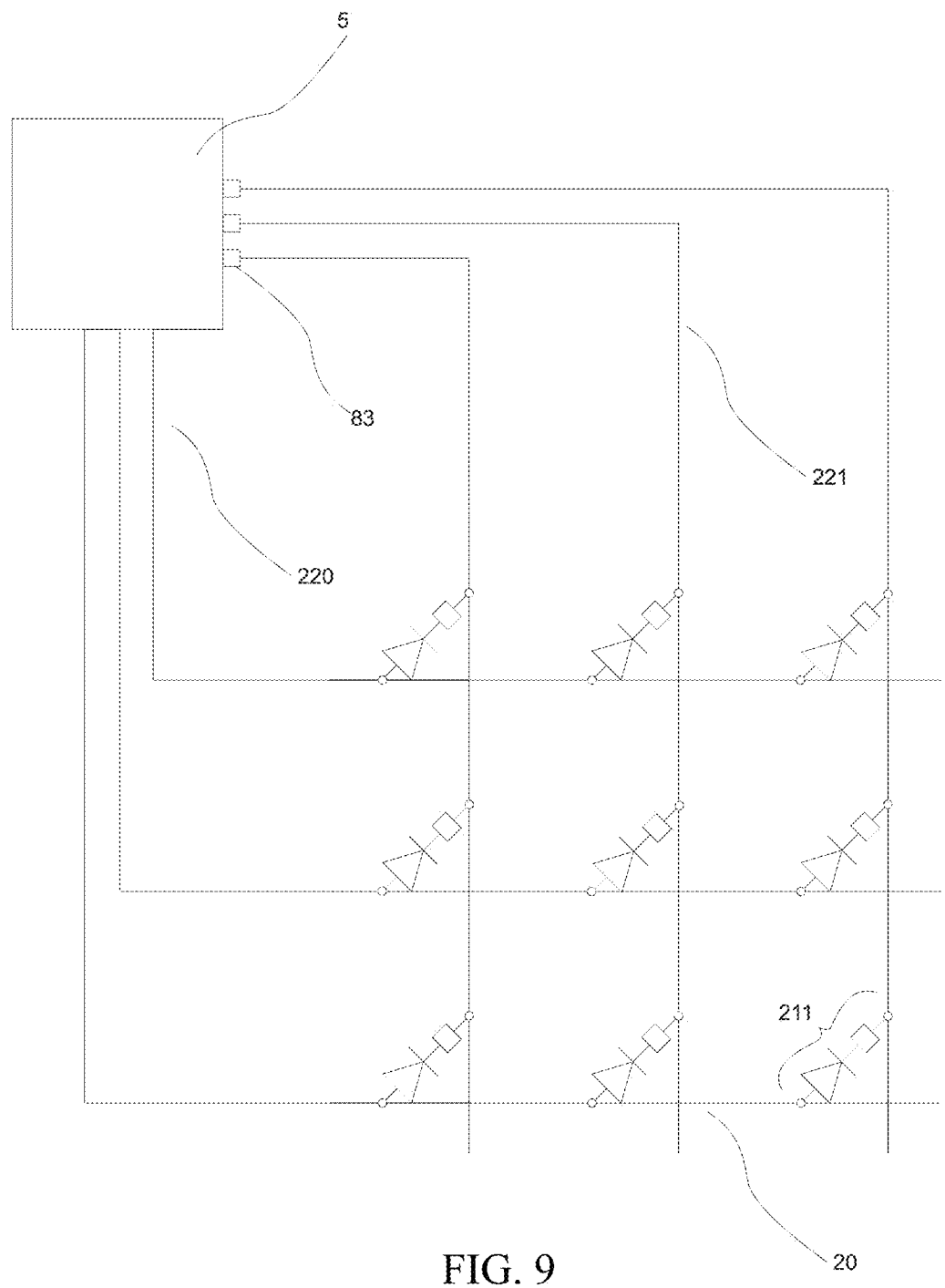
FIG. 9 shows a schematic of an ASA 20 with PDSE 211 where output conductive traces 220 connected to Digital I/O pins 82 of a Microcontroller 5 and input conductive traces 221 connected to ADC pins 83 of a Microcontroller 5.
Figure 10:
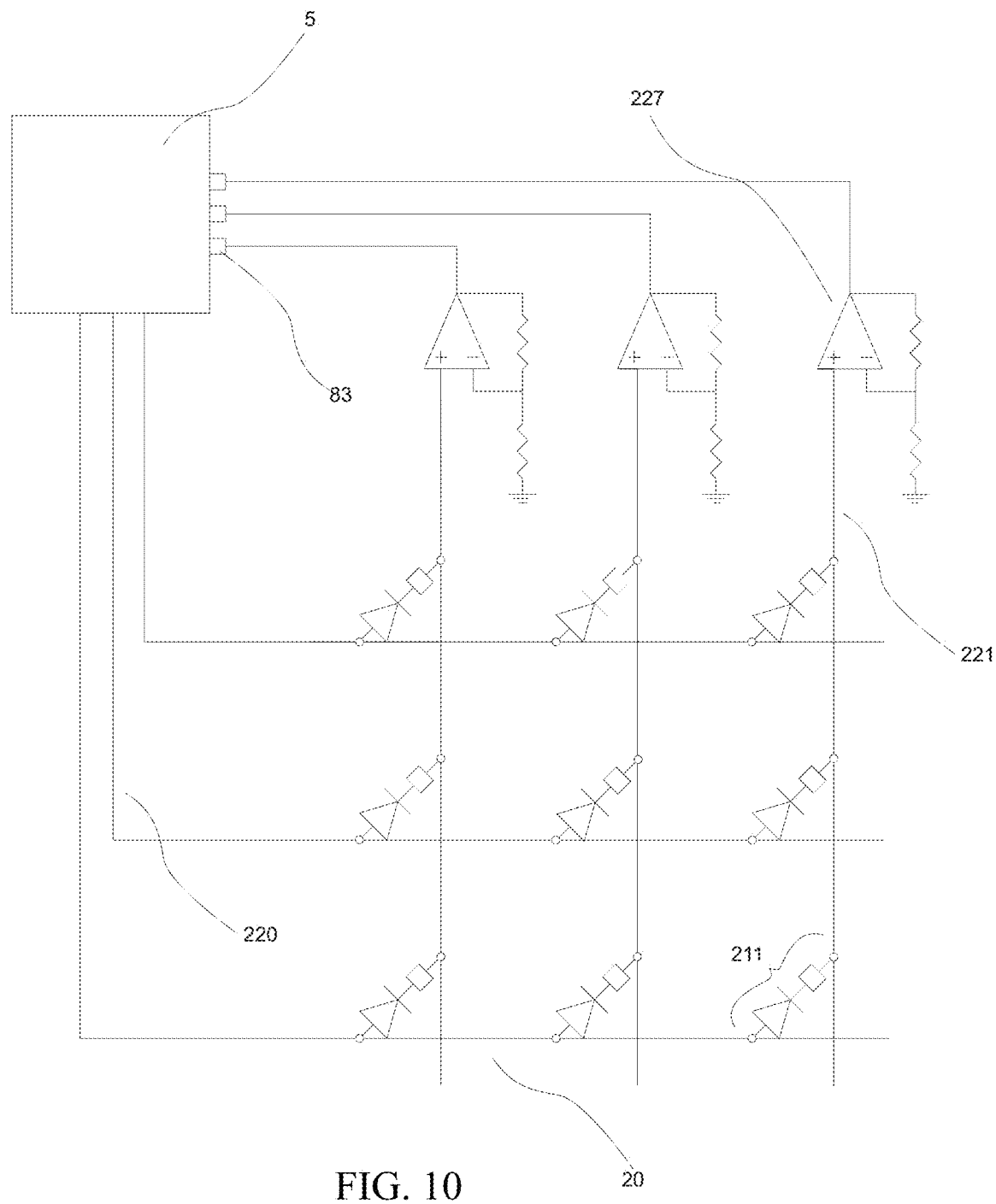
FIG. 10 shows a schematic of an ASA 20 with PDSE 211 where output conductive traces 220 connected to Digital I/O pins 82 of a Microcontroller 5 and input conductive traces 221 connected to operational amplifiers 227 that are connected to ADC pins 83 of a Microcontroller 5.
Figure 11:
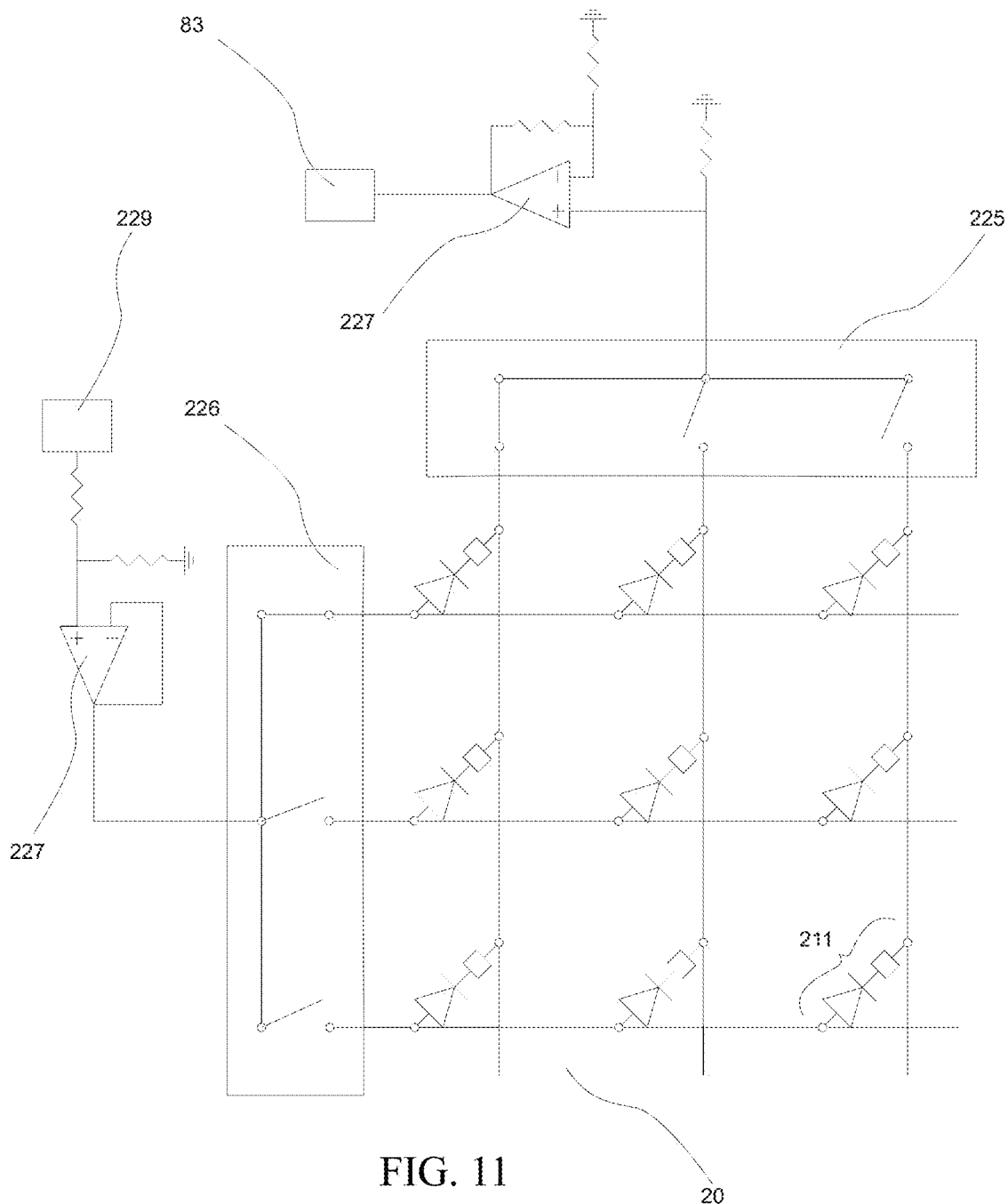
FIG. 11 shows a schematic of an ASA 20 with PDSE 211 where operational amplifiers 227, multiplexer 225 and demultiplexer 226 are used for scanning the active sensing array 20 by measuring voltage after the PDSE 211.
Figure 12:
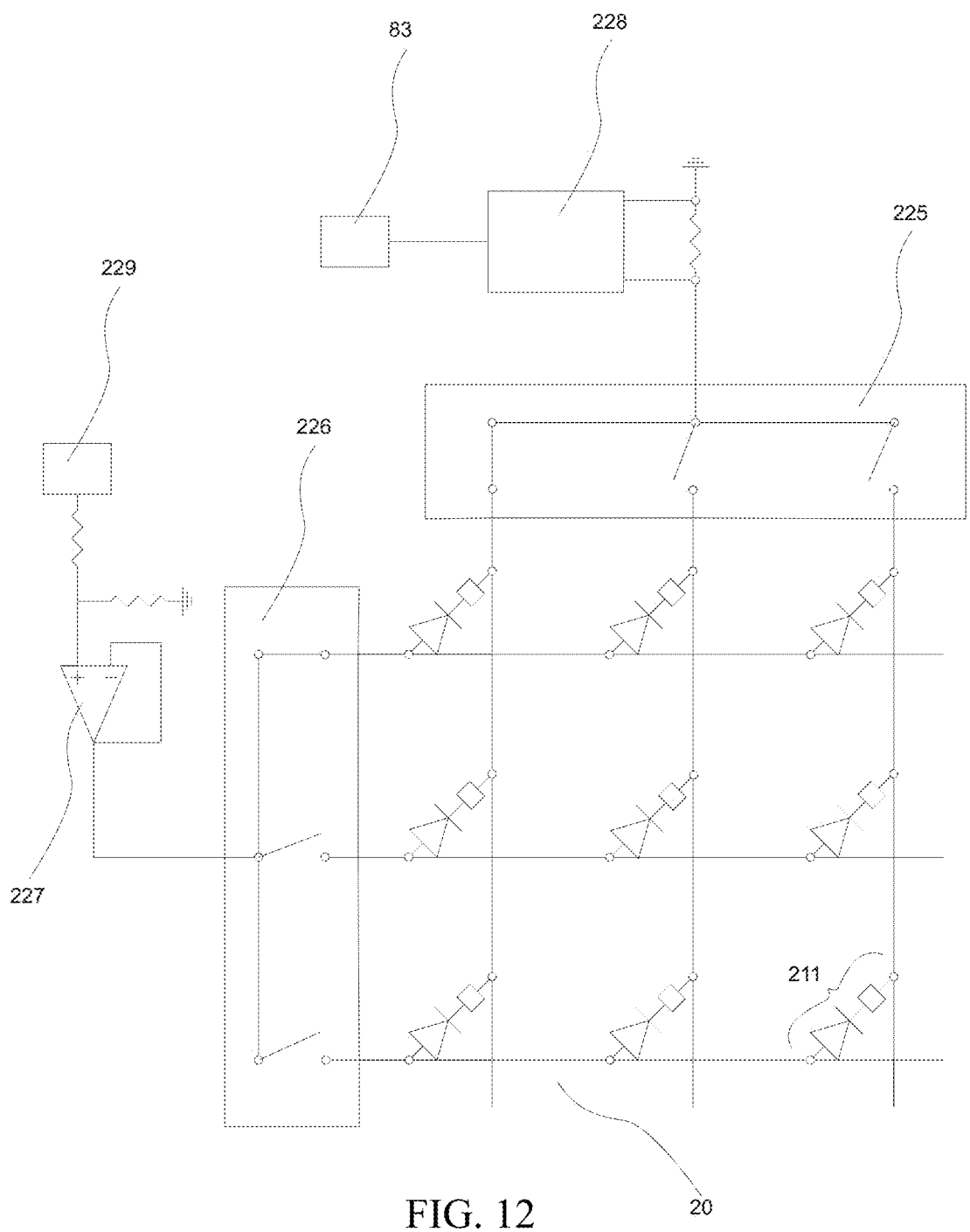
FIG. 12 shows a schematic of an ASA 20 with PDSE 211 where operational amplifiers 227, a multiplexer 225, a demultiplexer 226 and a current shunt monitor 228 are used for scanning the active sensing array 20 by measuring current after the PDSE 211.

For an active sensing array 20 embodiment with PDSE 211 connected to the printed circuit board 8, there are several means for switching the output conductive trace 220 that is powered are available. In the one embodiment, each output conductive trace 220 is connected to a digital I/O pin 82 on a microcontroller 5 that can switch between an output voltage and ground, as seen in FIGS. 9 and 10. In one implementation, each output conductive trace 220 was connected to a PIC24HJ256GP610 digital I/O 82 pin that supply 3.3V. In another embodiment, a single output voltage, created by a digital I/O 82, operational amplifier 227, or other integrated circuit, is connected to a demultiplexer 226 that gives a one output conductive trace 220 a voltage, while the other output conductive traces 220 are floating, as seen in FIGS. 11 and 12. Using a demultiplexer 226 allows for the same output voltage to be used for each output conductive trace 220. Additionally, a single output voltage can be tuned more easily. A reduced voltage means would mean that the current and power requirements for an active sensing array 20 would be reduced. In one implementation, a 3.3V was reduced to 1V by resisters in series that was fed into an operational amplifier 227 voltage follower circuit. The voltage of the operational amplifier 227 became the output for a demultiplexer 226, which supplied voltage to one output conductive trace 220 while the rest of the output conductive traces 220 were floating.

Printed Diode Sensing Elements

In this step, current passes from an output conductive trace 220 through a PDSE 211 to an input conductive trace 221 if the following conditions are met: a voltage difference exists between conductive traces 23, current is allowed to pass through the printed diode in the direction of the voltage difference, and mechanical forces applied to the printed sensing element 203 cause current to flow through the PSE. With a single PDSE 211, the voltage placed on the output conducting trace 220 can cause current through the PSE 203 if the input conducting trace 221 if there is a voltage difference, the MSM 202 is activated, and the current can pass in the direction of the voltage difference. If the PSE 203 did not have a printed diode 208, current could flow in either direction through the PSE 203.

FIG. 5 shows an embodiment of a network of PDSE 211 that relies on current flowing in one direction. In this figure, two signal inputs are being split between two signal outputs. As each PDSE 211 is activated, signal from each output voltage is being sent to its matched input voltage (Out1 to In1, Out1 to In2, Out2 to In1 and Out2 to In2). In a PSE 211 without printed diode 208, activating three sensing elements would cause a false positive 224 to appear from the fourth due to false positive 224 cross talk 222. With the PDSE 211, current can only flow from the output voltage to the input voltage and no cross talk is possible.

In an active sensing array 20 with PDSE 211, current flows from the output conducting lines 220 to the input conducting lines 221 if there is a voltage difference and MSM 202 activation. Two possible forms of the printed diode are the M-S Junction 209 and the P-N Junction 210. The M-S Junction 209 is created between a metal and an n-type semiconductor 207 as seen in FIGS. 1 and 3. A P-N Junction is created between a p-type 206 and an n-type semiconductor 207, as seen in FIGS. 2, 4 and 16.

Figure 8A:
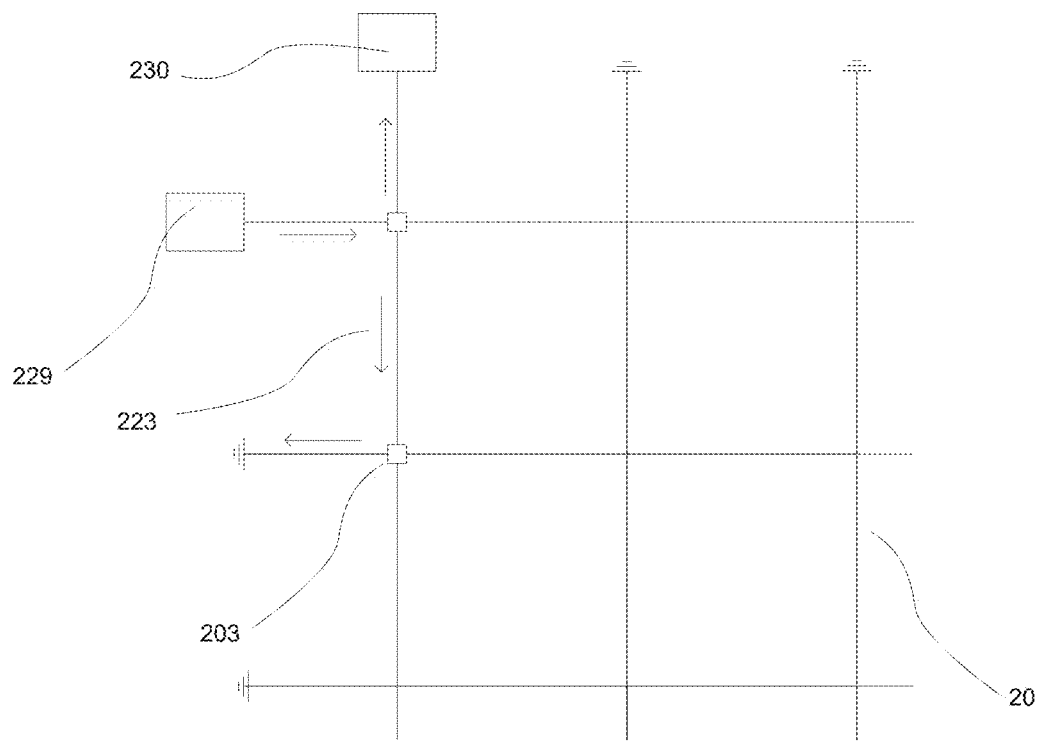
FIG. 8A shows an example of voltage drain 223 cross talk 222.
Figure 8B:
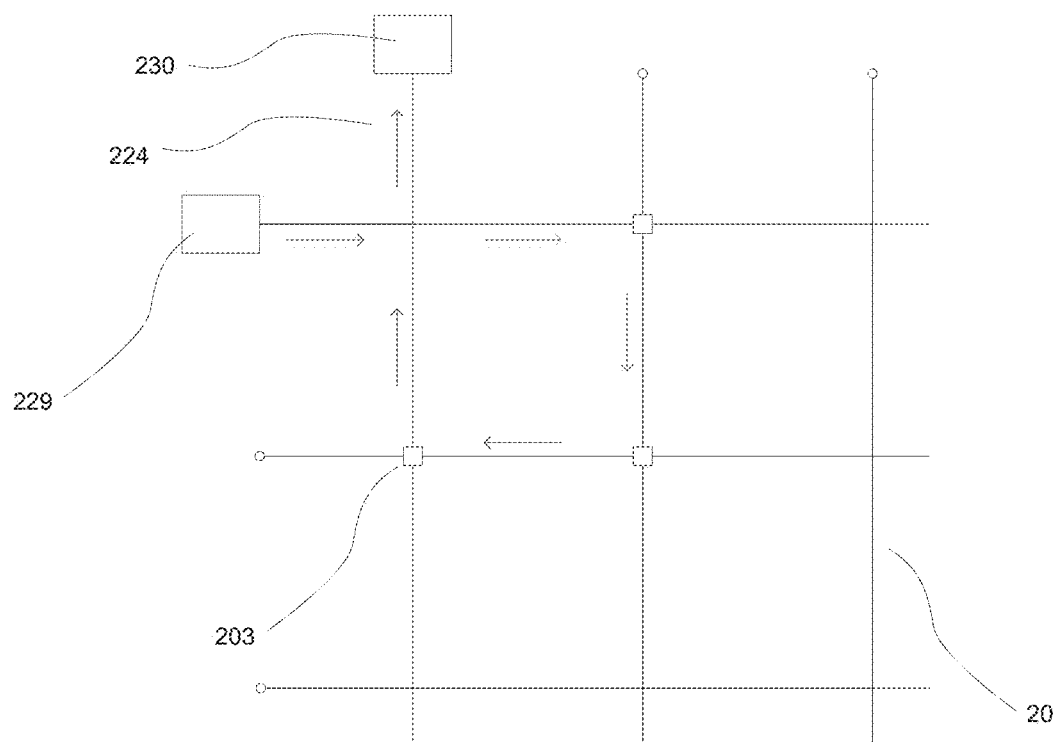
FIG. 8B shows an example of false positive 224 cross talk 222.

Without diodes controlling the direction of current in the PSE 203, the active sensing array could experience cross talk 222 drain 223 and false positive 224. This is in contrast to the embodiments described in this invention, where there is no cross talk 222 drain 223 and false positive 224 in the ASA 20 or any other similar network of PDSE 211. FIG. 8A shows an embodiment of drain cross talk in the active sensing array 20 without printed diodes. Drain occurs when parallel circuit paths to ground are made after passing though the sensing element being measured and moves through other sensing elements. FIG. 8B shows an embodiment of false positive cross talk in the active sensing array 20 without printed diodes. False positives occur when alternative circuits are formed from the output voltage 229 to the input voltage 230 other than the intended scanned sensing element.

A side effect of using a diode at every sensing element is there is a voltage drop when moving through the diode from the output conductive traces to the input conductive traces. As a result, the output voltage must overcome this voltage difference to have current pass to the input conductive traces. Thus, in an active sensing array, applied output voltage is higher when printed diodes are incorporated than when they are not.

Input Conductive Lines to Printed Circuit Board

In this step, when the input conductive line is connected to a printed circuit board and has a path to ground or another voltage source, current can flow and either the voltage or current after the sensing element can be read.

With a single PDSE 211, current flows from the PDSE, along the conductive trace 23 to an input voltage 230, as seen in FIG. 18, and can be connect to a printed circuit board 8. In an embodiment where voltage is read, an analog digital converter (ADC) 83 and a resistor to ground can be put in parallel and connected to the input conductive trace 221. The ADC in this embodiment would measure the voltage before the resistor and assign a numerical value to the voltage value depending on the range and settings of the ADC 83. In an embodiment where the current is being read, a current shunt monitor 228 is placed around a resistor that is connected to ground and the input conductive line. The current shunt monitor 228 determines the voltage difference across the resistor caused by the current and outputs a voltage that can be read by an ADC to assign a numerical value to the current across the resistor.

In one embodiment, the printed circuit board 8 is connected to an active sensing array 20, each input conductive trace 221 is connected to a pin on a microcontroller that can switch between an ADC 83 and ground, as seen in FIG. 9. In one implementation, each output conductive trace was connected to a PIC24HJ256GP610 pin that could be read by an onboard ADC 83.

An ADC, however, is often not flexible and is often set to a certain voltage range. In the case of the PIC24HJ256GP610, that range was 0V to 3.3V. Therefore, with the PDSE 211, the voltage drop across the printed diode diminished the voltage range at the ADC. Additionally, MSM 202 and conductive traces 23 have some resistance, resulting in a drop in voltage from a voltage source.

In another embodiment, input conductive traces 221 are connected to one or more operational amplifiers 227, seen in FIG. 10. These form non-inverting amplifying circuits to strengthen the voltage signal from the input conductive traces 221. In one implementation, each input conductive trace 221 is connected a non-inverting operational amplifier circuit, each of which feeds into an ADC 83 to measure voltage. In another implementation, each input conductive trace 221 is connected to a current shunt monitor 219 to measure current, which is connected to an ADC 83.

In FIGS. 11 and 12 embodiments with multiplexers 226, a single non-inverting operational amplifier circuit (FIG. 11) or current shunt monitor (FIG. 12) can be used and connected to a single ADC 83 pin. This removes the need for additional ADC pins 83, does not require the ADC to switch between pins and reduces the number operational amplifiers 227 or current shunt monitors 228.

Methods to Manufacture

In the PDSE 211, all layers are deposited using printed electronic techniques such as additive techniques like screen-printing, ink-jet, stamping and gravure and subtractive techniques like etching. Printed electronics can be printed on a variety of substrates, including flexible plastic films. Printed electronic manufacturing techniques facilitate low-cost, thin, and flexible devices. To form the PDSE 211, several printed electronic techniques can be used in conjunction. After each layer is printed onto the sensor surface sheet 21, the sheet is heated to evaporate or cure the material layer.

Figure 13:
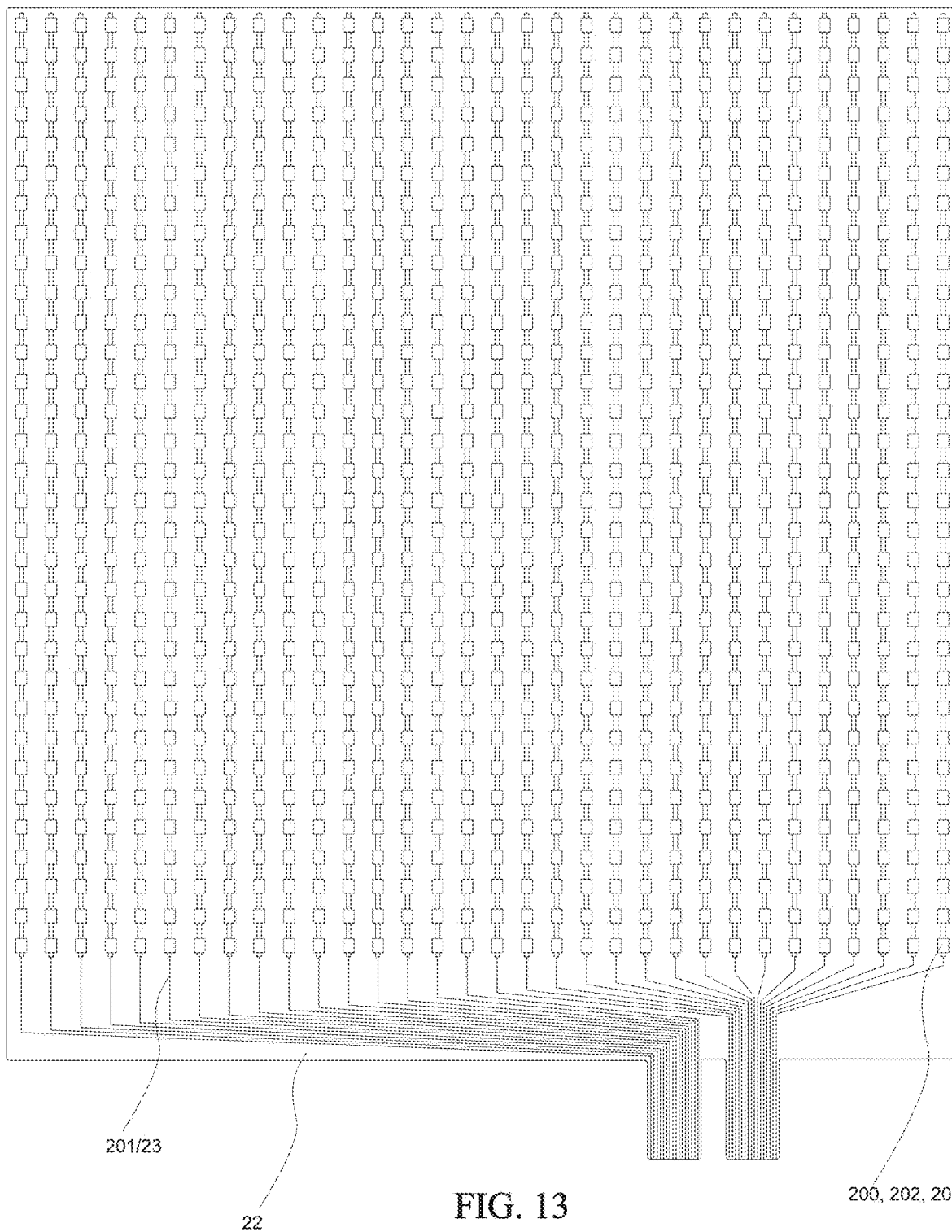
FIG. 13 shows an embodiment of a non-conductive surface substrate 22 with conductive material 201 and printed material 200, like MSM 202 or doped semiconductor 205.
Figure 14:
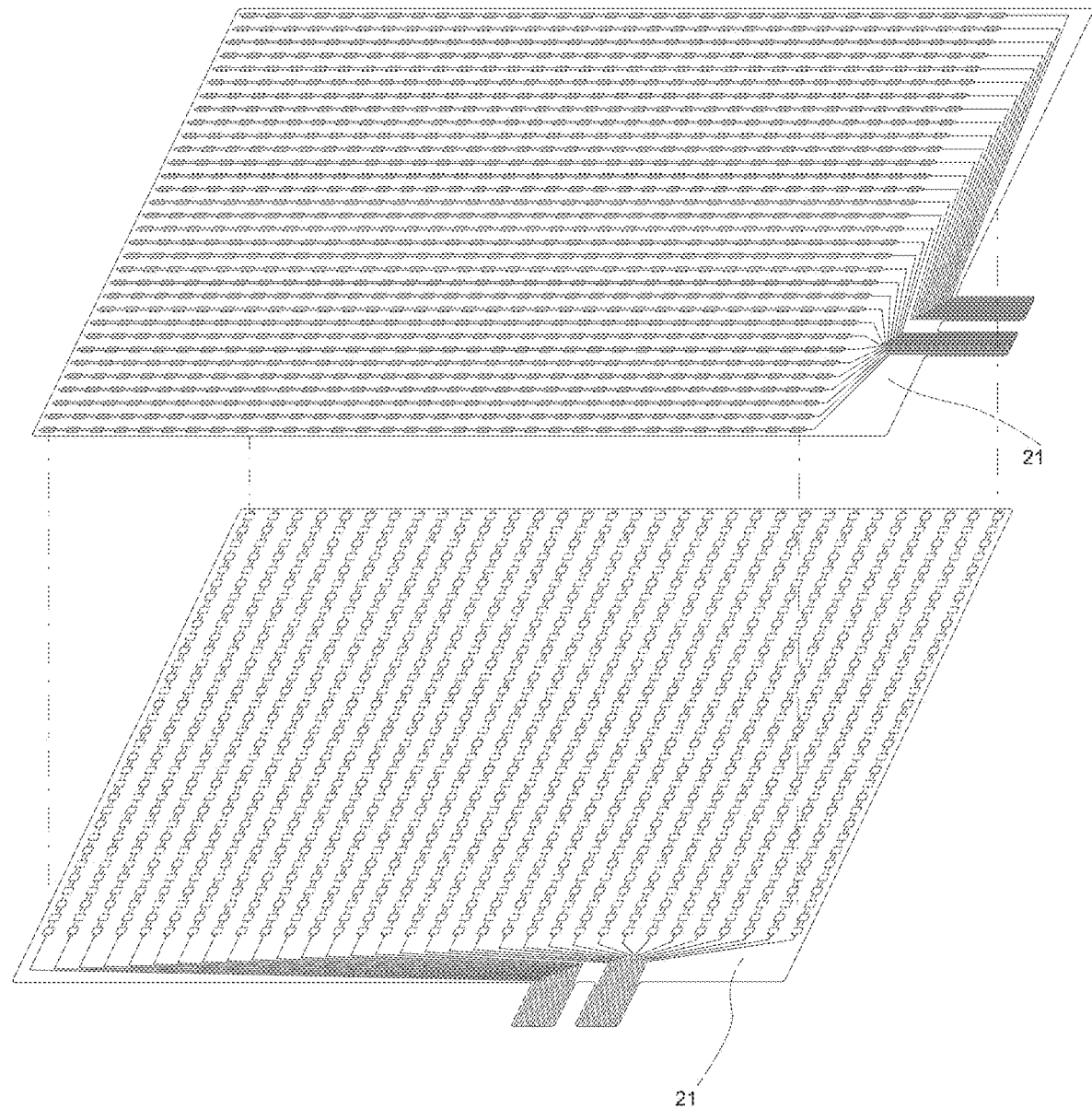
FIG. 14 shows the alignment of two non-conductive surfaces to create an ASA 20.
Figure 15:
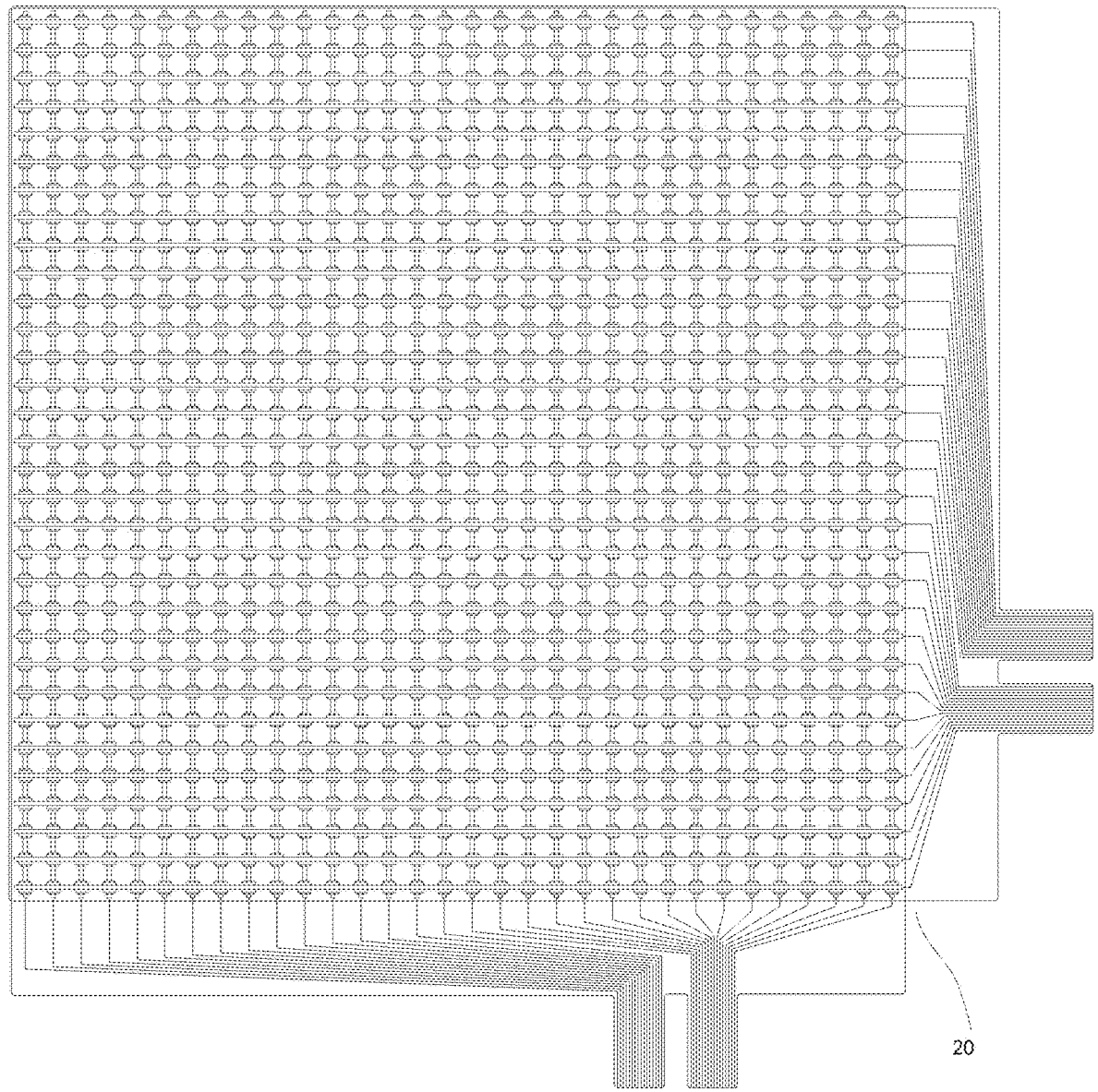
FIG. 15 shows an ASA 20.

An embodiment of the ASA with PDSE is shown in FIGS. 13, 14 and 15. FIG. 13 shows a single sensor surface sheet 21 with conductive traces 23, mechanical sensing material 202 and/or doped semiconductor 205. FIG. 14 shows the alignment of the sensor surface sheets and FIG. 15 shows the final ASA 20 with a PDSE 211 at each intersection.

In one embodiment, silver conductive material 201 and FSR material 24 are deposited using screen-printing and doped semiconductors of the printed diode are deposited using ink-jet to create a DPNSE 215 ASA 20. This embodiment detects forces that bring the two sensor surface sheets together and compress the layers of FSR material, lowering the resistance through the PDSE 211.

In another embodiment, silver conductive material 201, piezoelectric material 204 and doped semiconductor 205 are deposited using screen-printing on one sensor surface sheet to create a OSPNSE 215 ASA 20 that creates a pressure-sensitive sensor that responds to mechanical forces that compress the piezoelectric material. 204.

It is also possible to use printed electronic techniques to print organic LEDs 231 with one or more PDSE 211, either as the Printed Diode 208 or an alternate circuit. An OLED 231 is a type of printed diode that emits visible light when current flows through the diode. As a result, an OLED 231 can be used as the printed diode 208 within a PDSE 211, causing visual feedback to the mechanical forces being detected. One such embodiment of the PDSE 211 using FSR 24 as the MSM and using OLED 231 as the printed diode 208 would result in light emitting from the OLED when force is applied to the PDSE 211. An OLED display can also be printed on a non-conductive surface substrate 22 with one or more PDSE 211, where the PDSE and the OLED display are on separate circuits. This allows for an OLED display to be controlled by a microcontroller without interfering with the PDSE sensing, but requires only one printed electronic component rather than two, potentially making the combined component thinner and cheaper than the separate components.

Assembly

Using FSR material 24, organic doped semiconductors 205, silver conductive material 21 and mylar non-conductive surface substrates 22, several single PDSE were created, which formed SMSSE 212 and SPNSE 213 implementations.

To begin, pads of silver conductive material 201 were screen-printed on mylar non-conductive surface substrates 22. After screen-printing the silver, the mylar sheets were placed in an oven to evaporate solvent within the silver conductive material. On half of the mylar sheets, two layers of FSR material 24 were screen-printed over the conductive material so that the FSR material is in contact with the silver conductive material 201. After each FSR material layer, the Mylar sheets were placed in an oven to cure the FSR material.

If a mylar sheet with conductive material and a mylar sheet with conductive and FSR material are brought together so that FSR material of one sheet is in contact with conductive material of the other, then a PSE 203 is formed. When forces are applied to the PSE that compress the FSR material of one mylar sheet to conductive material of the other mylar sheet, the resistance between the layers of silver conductive material decreases.

To transform the PSE to PDSE, printed diodes 208 were deposited on the mylar sheets with conductive material only. Two printed diode 208 implementations were created: the M-S Junction 209 and the P-N junction 210. The M-S junction 209 printed diode 208 was formed from n-type semiconductor ink 207 deposited over the conductive material. In this implementation, the n-type semiconductor ink 207 was a 2% concentration of Polyera AcivInk N2200 in a 1,2 Dichlorobenzene solution. After depositing the solution using pipettes, the mylar sheets were place in an oven to evaporate the Dichlorobenzene solvent. The P-N junction 210 printed diode 208 was formed from n-type semiconductor ink 207 deposited over p-type semiconductor ink 206 deposited over the conductive material. In this implementation, the p-type semiconductor was a 2% concentration of Polyera ActivInk P0400 in a 1,2 Dichlorobenzene solution, and the n-type semiconductor ink 207 was a 2% concentration of Polyera AcivInk N2200 in a 1,2 Dichlorobenzene solution. After each deposition of semiconductor ink, the mylar sheets were placed in an oven to evaporate the Dichlorobenzene solvent.

Placing the mylar sheet with semiconductor and conductive material together with the mylar sheet with FSR and conductive material so that the semiconductor was in contact with the FSR material, resulted in PDSE being formed. With the M-S junction implementation, SMSSE 211 were created. With the P-N junction implementation, SPNSSE 212 were created.

A 9V multimeter was used to verify that voltage supplied to the conductive material on the printed diode mylar sheet allowed current to flow through the printed diode, meaning the multimeter could measure the varied resistance of the FSR material as it was compressed into the semiconductor. When voltage was supplied to the conductive material on the FSR material mylar sheet, no current could flow through the diode and the resistance of the FSR material could not be measured.

The following U.S. patent applications are all incorporated by reference herein: U.S. patent application Ser. No. 13/317,138; U.S. provisional patent application No. 61/686, 472 filed Apr. 5, 2012; U.S. provisional patent application No. 61/655,075 filed Jun. 4, 2012.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method of producing a printed-diode sensing element comprising the steps of: screen-printing on mylar non-conductive surface substrates pads of silver conductive material; placing the mylar sheets in an oven to evaporate solvent within the silver conductive material; screen-printing on a first mylar sheet of the mylar sheets, two layers of Force Sensitive Resistor (FSR) material over the silver conductive material so that the FSR material is in contact with the silver conductive material; depositing printed diodes on a second mylar sheet of the mylar sheets with silver conductive material only; forming a semiconductor on the second mylar sheet; and placing the second mylar sheet with the semiconductor and silver conductive material together with the first mylar sheet with FSR and conductive material so that the semiconductor is in contact with the FSR material, resulting in a printed-diode sensing element being formed.

\* \* \* \* \*